Figure 1:
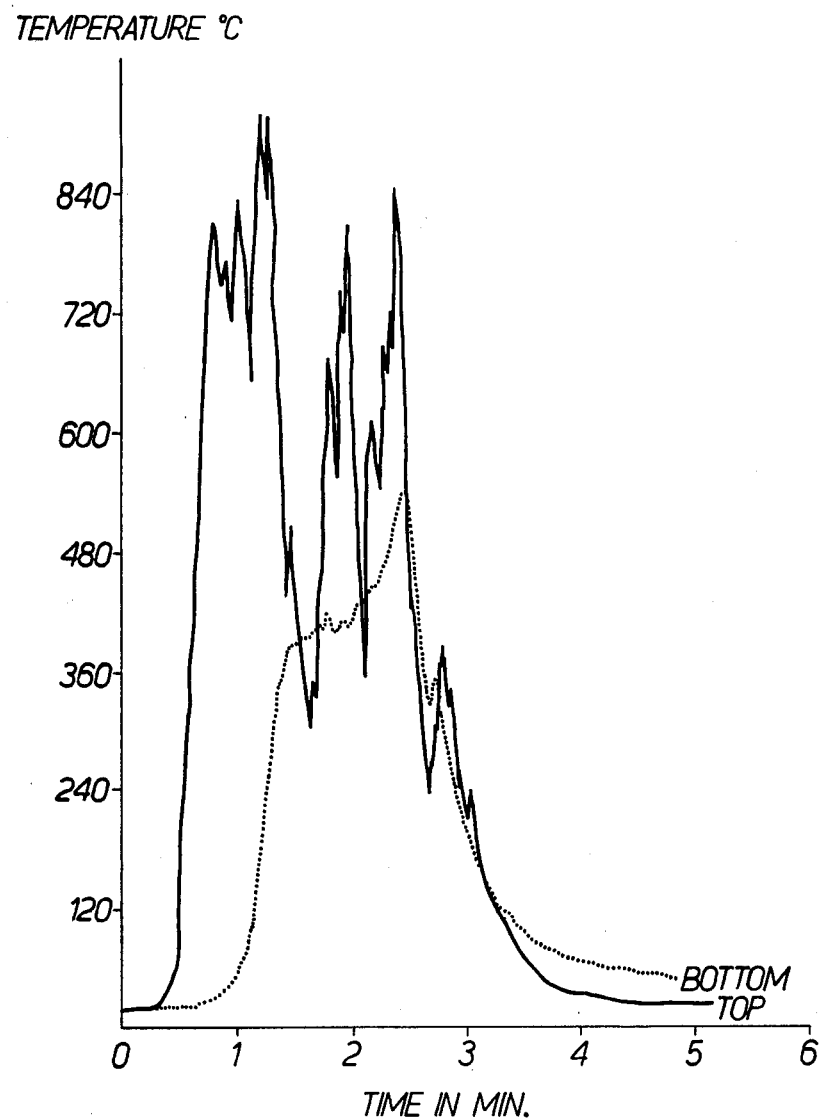

United States Patent [19]

Smith et al.

[11] 4,444,914

[45] Apr. 24, 1984

[54] SMOKE AND TOXIC GAS SUPPRESSANT SYSTEM

[76] Inventors: Derek A. Smith, 110 Frognal, London, NW3; Stephen J. Grayson, 8 Bennett Park, Blackheath, London SE3 9RB; John Hume, 46 Boleyn Rd., Forest Gate, London E7 9QE, all of England

[21] Appl. No.: 416,311

[22] Filed: Sep. 9, 1982

[30] Foreign Application Priority Data

Sep. 11, 1981 [GB] United Kingdom ................ 8127549

[51] Int. Cl.$^3$ .......................... C08J 9/00; C08G 18/02
[52] U.S. Cl. .................................... 521/130; 521/157; 521/167
[58] Field of Search ........................ 521/130, 157, 167

[56] References Cited

U.S. PATENT DOCUMENTS

| | | | |
|---|---|---|---|
| 3,637,542 | 1/1972 | Doerge et al. | 521/130 |
| 3,647,724 | 3/1972 | Doerge et al. | 521/167 X |
| 3,758,638 | 9/1973 | Doerge et al. | 521/167 X |
| 4,055,545 | 10/1977 | Dieck et al. | 521/130 X |
| 4,069,173 | 1/1978 | Kauffman et al. | 521/157 |
| 4,071,482 | 1/1978 | Hopkins et al. | 521/130 |
| 4,076,654 | 2/1978 | Yukuta et al. | 521/130 X |
| 4,356,274 | 10/1982 | Sandler et al. | 521/126 X |

FOREIGN PATENT DOCUMENTS

| | | |
|---|---|---|
| 504480 | 4/1939 | United Kingdom . |
| 913861 | 12/1962 | United Kingdom . |
| 1287017 | 8/1972 | United Kingdom . |
| 1379752 | 1/1975 | United Kingdom . |
| 1389793 | 4/1975 | United Kingdom . |
| 1451335 | 9/1976 | United Kingdom . |
| 1450446 | 9/1976 | United Kingdom . |
| 1474031 | 5/1977 | United Kingdom . |
| 1500612 | 2/1978 | United Kingdom . |
| 1505127 | 3/1978 | United Kingdom . |
| 1520223 | 8/1978 | United Kingdom . |
| 1570316 | 6/1980 | United Kingdom . |
| 2071717 | 9/1981 | United Kingdom . |

OTHER PUBLICATIONS

J. of Fire Retardant Chemistry, vol. 8, No. 2, May 1981, pp. 93–105.

*Primary Examiner*—Lucille M. Phynes
*Attorney, Agent, or Firm*—Mason, Fenwick & Lawrence

[57] ABSTRACT

A composition comprising a combustible material, especially a polyurethane, and a smoke and toxic gas (STG) suppressant system, comprising (A) an STG-suppressant with (B) a combustion rate- and/or flame temperature-reducing component, or (C) a char-stabilizer, components (B) and (C) preferably both being present.

28 Claims, 10 Drawing Figures

SMOKE AND TOXIC GAS SUPPRESSANT SYSTEM

This invention relates to the suppression of the formation of smoke and toxic products, e.g., gases, in the combustion of materials, especially natural and synthetic polymeric foam materials which contain isocyanate moieties, such as the rigid and flexible polyurethane foams which are increasingly employed in building structures, decoration and furnishings, and in other areas such as transport and engineering.

It has been long recognized that smoke and the toxic products which are generated in fires are a primary cause of death and injury to both civilians and fire fighters; for this reason, extensive research has been carried out to reduce their effect, both in terms of structural and design modifications and in terms of the constitution of the materials themselves. Thus, in the latter respect, various additives have been proposed in order to eliminate or reduce the effect of the many products formed during combustion, the additives proposed ranging from materials which act as flame retardants to inorganic and organic materials which act to suppress the damaging affect of the materials formed upon combustion, namely smoke, carbon monoxide, and nitrogen-containing materials, including $NO_2$, $NO$, $HCN$ and various toxic organic nitrogenous materials such as amines, nitriles and isocyanates.

To date, however, no completely satisfactory additives have been found, as, unfortunately, is evidenced by several recent disasters arising from fires in which polyurethane foam materials were contributors to death and injury, and, furthermore, many of the proposed additives have proved commercially unsuitable with regard to processing and, in many cases, they adversely affect the desired physical properties of the foams, especially when they are incorporated at high levels.

The present invention is, in the first instance, based upon our appreciation that the evolution of smoke and toxic gases (STG) upon combustion of combustible materials cannot, in general, be ascribed to any individual chemical or physical reaction, but depends upon a number of various reactions which collectively contribute to STG formation. In this respect, whilst the present invention is directed to materials which act to reduce or delay both smoke production and toxic gas production it also includes materials which act wholly or mainly to reduce or delay smoke production and materials which act wholly or mainly to reduce or delay toxic gas production, and the term "STG" as used herein is to be understood to include all such possibilities. The term "suppress" is used to include cases where the total amount of STG is reduced and cases where the effect is primarily to delay STG emission even though the total amount of STG production may not be reduced.

In its broadest aspect, therefore, the present invention provides a multifunctional system which is capable of suppressing STG formation, especially in macromolecular materials containing isocyanate moieties. For the sake of convenience, the present invention will hereinafter be discussed with reference to polyurethane-based materials, especially foam materials, but it will be appreciated that it is applicable to other materials, including, for example, natural foam rubbers and neoprene-based foams, as well as others where smoke and/or toxic gas generation upon combustion poses serious problems.

The essence of the present invention is to provide a multifunctional STG-suppressive system for incorporation into such materials, the fundamental component being an STG-suppressant material (A), preferably a char-inducing or char-enhancing material, it having been found that smoke suppression is in general enhanced by materials which are capable of producing stable char formation upon combustion.

Smoke-suppressants for polyurethanes have been investigated and those skilled in the art will be aware of materials worthy or investigation and selection, bearing in mind that the materials should be compatible with the other component(s) of the multifunctional system in accordance with the present invention and that they should be capable of incorporation within the polyurethanes, preferably without significantly adversely affecting other desirable properties. As will be appreciated, the STG-suppressant material can be incorporated during the manufacture of the polyurethane, or during foaming, or may be applied by a post-impregnation of the polyurethane foam and, for this reason, certain materials may be unsuitable for certain applications because, for example, they may react undesirably with other components, e.g. the isocyanate, during formation of the polyurethane. The same criteria apply to the other component(s) of the multifunctional systems of the present invention.

However, consistent with the above remarks, we have found that the essential STG-suppressant component (A) can suitably be selected from, inter alia, the the following materials:

ferrocene, zinc borate, potassium fluoroborate, anisaldehyde, polyhydroxy compounds, especially carbohydrates, for example sorbitol. More especially, however, there may be used a carboxylic acid having less than 20, advantageously less than 10 carbon atoms, preferably a di- or higher poly-carboxylic acid, or a corresponding anhydride. Aliphatic, including cycloaliphatic, compounds containing carbon to carbon, especially ethylenic, unsaturation, or aromatic compounds are preferred. Of such compounds there is advantageously used maleic, fumaric, trimellitic, pyromellitic, or mellitic acid or a corresponding anhydride, the preferred compounds being maleic acid and pyromellitic dianhydride. Other, but less preferred, compounds are chlorendic, succinic, adipic, benzoic, phthalic and isophthalic acids and anhydrides thereof. Other derivatives of suitable acids, for example, esters, salts, acid halides, may also be employed. Although the applicants do not wish to be bound by any theory, it is believed tha the derivatives which are especially suitable are the precursors of the acid in the sense that they may act, under the conditions of incorporation or of combustion, to form the acid or a derivative thereof that is formed under such conditions.

Where components (B) and (C) below are acids, they may, if appropriate and desired, similarly be used in the form of anhydride or other derivative.

It is essential to the present invention that the multifunctional system should comprise at least one material, such as those listed above, which functions as an STG-suppressant, preferably by char formation.

However, it is also essential to the fundamental concept of the present invention that the system comprises a component which acts, preferably synergistically, to enhance the basic STG-suppressant effect.

In one aspect, therefore, the present invention accordingly provides a multifunctional STG-suppressant system for natural and synthetic materials, especially those containing isocyanate moieties, such as polyurethane foams, said system comprising:

(A) an STG-suppressant component together with;
(B) a combustion rate-reducing component and/or flame-temperature-reducing component and/or
(C) a char-stabilising component.

The present invention also provides materials incorporating such systems, especially polyurethane foam materials.

In this respect, without wishing to limit the present invention by theory, it is believed that apart from the basic presence of the STG-suppressant material (A) there are two further fundamental considerations, as described below, the related components being labelled (B) and (C), although it will be appreciated that the overall system may comprise:

(A)+(B) (i.e. minus (C)); (A)+(C) (i.e. minus (B)); or (A)+(B)+(C), the choice of the appropriate combination depending on the specific base polymer material and end application concerned, and that, in some instances, a single component may be capable of exhibiting any two or all three of the functions (A), (B) and (C), although, in general, they will be provided by at least two and, preferably, three different chemical compounds and, it is thought, optimum performance will in general be obtained by employing separate materials for each of the functions.

In one aspect, the present invention is based on our surprising observation that the STG-suppressant effect of component (A) can significantly be improved by incorporating a component which lowers the combustion rate and/or reduces the flame temperature of the basic material (preferably by diluting the gases formed on combustion rather than by exclusion of oxygen) without producing significant amounts of smoke, advantageously without preventing char formation, and preferably with some degree of char formation to enhance the effect of component (A). Materials which have been found to be especially suitable in this respect for polyurethane foams are oxalic acid, trimellitic acid and hydrated alumina, but those skilled in the art will be able to select other candidates by routine testing.

It will be appreciated that component (B), as with components (A) and (C), should be one which does not itself produce substantial amounts of smoke and/or toxic gases during combustion.

In a further aspect, the present invention is based on our discovery that the STG-suppressant properties of component (A), and components (A)+(B), are enhanced by the incorporation of a component (C), which fulfils a function that, it is believed, has heretofore been unappreciated by those skilled in the art, as will be explained in more detail with reference to the Examples which follow. We have surprisingly found that whilst initial smoke and toxic gas generation can be considerably suppressed by char formation in the presence of component (A), in some cases secondary STG generation arises because of degradation and pyrolysis of the initially-formed char under the intense heat experienced. However, by the incorporation of components (C), as binding agent or char stabiliser, these secondary reactions can be substantially reduced or delayed. This is evidenced by experimental results which show that whereas, in the absence of components (C), a secondary char combustion and STG-generating reaction usually takes place, in its presence the combustion progress is smoother, and only one combustion peak is reached, making it more easy to control STG-generation by the presence of component (A) and, preferably, component (B). The overall effect of this is to produce a char which is capable of retaining higher proportions (based on the initially present amounts) of the potentially toxic gas- and smoke-producing elements in the foam, notably carbon and nitrogen.

Amongst materials suitable as component (C) there may be mentioned hydroxycarboxylic acids, especially hydroxy polycarboxylic acids, e.g., the fruit acids. There may be mentioned ascorbic, mucic, citric, tartaric and malic acids, the latter being especially preferred. However, those skilled in the art, given the teaching of the present invention, will be able to select other suitable materials, if necessary by routine testing.

As with components (A), components (B) and/or (C) may comprise a mixture of two or more materials and it will be understood that further additives may be incorporated, according to the basic material and the desired application.

As has been explained above, the multifunctional suppressant systems of the present invention can be utilized in various basic materials, but they are especially suited to materials incorporating isocyanate linkages, particularly polyurethanes, notably the rigid foams commonly based on toluene diisocyanate (TDI) and diphenylmethane-4, 4'-diisocyanate (MDI) and, especially, the flexible foams, usually based on TDI, which are increasingly employed in modern furnishings, fixtures and fittings. These polyurethanes, can be based, for example, on both polyester and polyether polyols, trialkanolamines, and aminic polyols, e.g., those derived from alkylene oxide adducts of amines and ammonia. They may incorporate various blowing agents such as water, carbon dioxide and perhalohydrocarbons, such a trichlorofluoromethane, as well as other adjuvants (or residues thereof) such as catalysts, e.g., tin compounds such as dibutyl tin acetate, surfactants and emulsifiers, as well as conventional fire-retardants, such as antimony oxide, phosphorus compounds, such as organic phosphates, phosphites and phosphonates, and halogen-containing compounds.

In so far as the incorporation of certain of the preferred components (A), (B) and/or (C) may cause problems of undesired interaction with other components used in the polymerisation of subsequent processing of their materials they may, if necessary, be incorporated in encapsulated form or in the form of non-reactive derivatives which release the active components during formation of the polyurethane, during foaming, and/or under combustion conditions. Alternatively, they may be incorporated by post-impregnation in the form, for example, of a dispersion in a suitable volatile liquid, e.g., industrial methylated spirit (IMS), methanol and ethanol, although this will not always be feasible on a commercial scale.

The components will in general be incorporated in dispersed form, e.g., in solution in the polyol, the amounts of components (A), and (B) and/or (C), varying from material to material and from application to application. In general, the total amount of (A) together with (B) and/or (C), as present, will be in the range of from 1 to 50 parts by weight of the basic materials, amounts in the range of from 5 to 40, especially from 7 to 30, parts by weight being preferred. Within this context, the proportions of (A), and (B) and/or (C) may similarly vary according to the material and application concerned, but, in general, (A) will preferably constitute not less than 30% of the suppressant system, usually from 40 to 80%, and (B) and (C), if both are present, will usually be used in amounts corresponding to a (B):(C) ratio of 4:1 to 1:4, preferably from 3:1 to 1:3, especially from 2:1 to 1:2, more especially in approximately equal amounts.

Thus, taking the case of three especially preferred suppressant systems of the present invention.

1. A maleic acid (A)—oxalic acid (B) system will be used up to a total amount of 30% based on a flexible TDI polyurethane foam, the (A):(B) ratio being about 2:1.

2. A maleic acid (A)—oxalic acid (B)—malic acid (C) system will be used up to a total amount of 30% the (A):(B):(C) ratio being about 4:1:1.

3. A pyromellitic dianhydride (A)—trimellitic acid (B)—tartaric acid (C) system will be used up to a total amount of 30% the (A):(B):(C) ratio being about 4:1:1.

It should be emphasized that the present invention is directed to systems in which the essential roles are fulfilled so as to achieve delay in or suppression of the formulation of smoke and toxic gases and, in this respect, that, as is illustrated in the following Examples, the systems of the present invention not only reduce smoke formation but also considerably delay or reduce the evolution of toxic gases such as CO, HCN, nitrogen oxides, organic nitrogen compounds etc., generally, it is thought, by increased char formation leading to retention of residual carbon and nitrogen which might otherwise be free to produce toxic substances.

Finally, it will be appreciated that the compositions of the present invention may be used in a wide variety of products. It will also be appreciated that the role of the component(s) may vary according to the various modes of combustion, e.g., free burning, pyrolysis etc., which may vary during the course of a fire. Thus, they may be used in conjunction with formulations and constructions in which other measures have been taken to combat STG generation, including, for example, furnishings comprising outer covering materials of natural or synthetic material such as leather, textiles, polyvinylchloride, polypropylene or viscose velour and the present invention is intended to be used in conjunction with such materials and constructions in order better substantially to eliminate or retard STG generation in fires.

The following Examples, in which all percentages are by weight unless otherwise stated, illustrate the invention:

EXAMPLE 1

As has been explained above, an important aspect of the STG-suppressant systems of the present invention is that they lead to increased char formation and, in particular, act to retain within the char significantly higher proportions of the potentially dangerous elements carbon and nitrogen.

The following Table shows the results obtained by analysis of the residual char formed when various formulations based on a standard flexible polyurethane foam D7 (polypropyleneoxide/TDI) were allowed to burn freely in air. Apart from the standard, which was the untreated foam, the other samples were prepared by impregnating the foam using a dispersion of the particulate additives in methylated spirit. The level of additive, based on the weight of the polyurethane foam, is shown in each instance. The smoke level was estimated visually as 1 (low), 2 (medium) and 3 (high).

| Sample | | Visual smoke level | % Element retention in char | | | |
|---|---|---|---|---|---|---|
| | | | C | H | N | O |
| Standard foam | | 3 | 23 | 19 | 16 | 26 |
| +20% | Maleic acid | 1 | 43 | 45 | 54 | 37 |
| +20% | Tartaric acid | 2 | 24 | 11 | 43 | 11 |
| +20% | Malic acid | 1 | 35 | 16 | 18 | 18 |
| +30% | Maleic acid | 1 | 34 | 27 | 59 | 25 |
| +20% | Maleic acid | | | | | |
| +6% | Malic acid | 1 | 45 | 32 | 61 | 19 |
| +4% | Oxalic acid | | | | | |

It will be seen that, as compared with the standard foam, the incorporation of maleic acid led to a significantly increased char formation accompanied by a greatly increased retention of the individual elements in the foam. Such an improvement was not shown by the incorporation of tartaric and malic acids. However, it will also be noted that when a multifunctional system comprising maleic, oxalic and malic acids, in accordance with the present invention, was employed the overall char formation was greater compared to a comparable level of maleic acid alone and, in particular, that the carbon and nitrogen retention was significantly increased.

EXAMPLE 2

The sample containing maleic acid, malic acid and oxalic acid described in Example 1 was then further tested using the furnace micropyrolysis technique based on that described by B. C. Cox and B. Ellis, Analytical Chemistry 1964, 36, p 90, in order to investigate the yields of HCN at various temperatures. The results were compared with those obtained using the standard flexible polyurethane foam alone. Results are shown in the table below, the HCN levels being indicated in units per milligram of foam material or foam material plus additives, respectively. It will be seen that at 700° C. the HCN yield from the foam treated in accordance with the present invention was as low as 25% of that from the untreated foam and, although this yield differential decreased as the temperature was raised to 850° C. and 1000° C., it will be appreciated that, in real fires, evolution of HCN occurs continuously as the temperature is raised during combustion and, accordingly, that the total emission of HCN from the treated material will be substantially less than that from the untreated material or reach a maximum concentration later in the fire.

| Micropyrolysis temperature, °C. | HCN Yields units/mg | |
|---|---|---|
| | Untreated foam | Treated foam |
| 700 | 2 | 0.5 |
| 850 | 56 | 34.7 |
| 1000 | 98 | 87.0 |

In addition the materials were tested for smoke evolution in a conical furnace as described in *Plastics & Polymers* 1974, 42 (No. 161), 200, by A. M. Calcraft, R. J. S. Green and T. S. McRoberts, the samples being tested at 300° C. using an ignitor. In this case, the multifunctional system in accordance with the present invention was also compared with a sample in which the polyurethane foam included 30% by weight of maleic acid alone. The maximum optical density measurement, which is a logarithmic value, was 0.8 for the untreated foam, 0.36 for the foam incorporating 30% of the maleic acid and 0.31 for the foam incorporating the multifunctional three acid system of the present invention which, it will be appreciated, represents a very significant drop in smoke generation.

EXAMPLE 3

In this Example three samples were tested by free burning in air. The samples were prepared in the form of discs having a diameter of 3" (~75 mm) and a thickness of 1" (~25 mm) and thermocouples were inserted into the centre of the discs on the top and bottom surfaces. The temperatures experienced on these regions were monitored for a period of time after a flame had been applied to the top of the disc in order to initiate combustion and the results are shown in FIGS. 1 to 3 which show the results obtained for the standard flexible polyurethane foam, a similar foam impregnated with 20% by weight maleic acid and a similar foam impregnated with 20% by weight maleic acid and 10% by weight oxalic acid, respectively.

Figure 2:
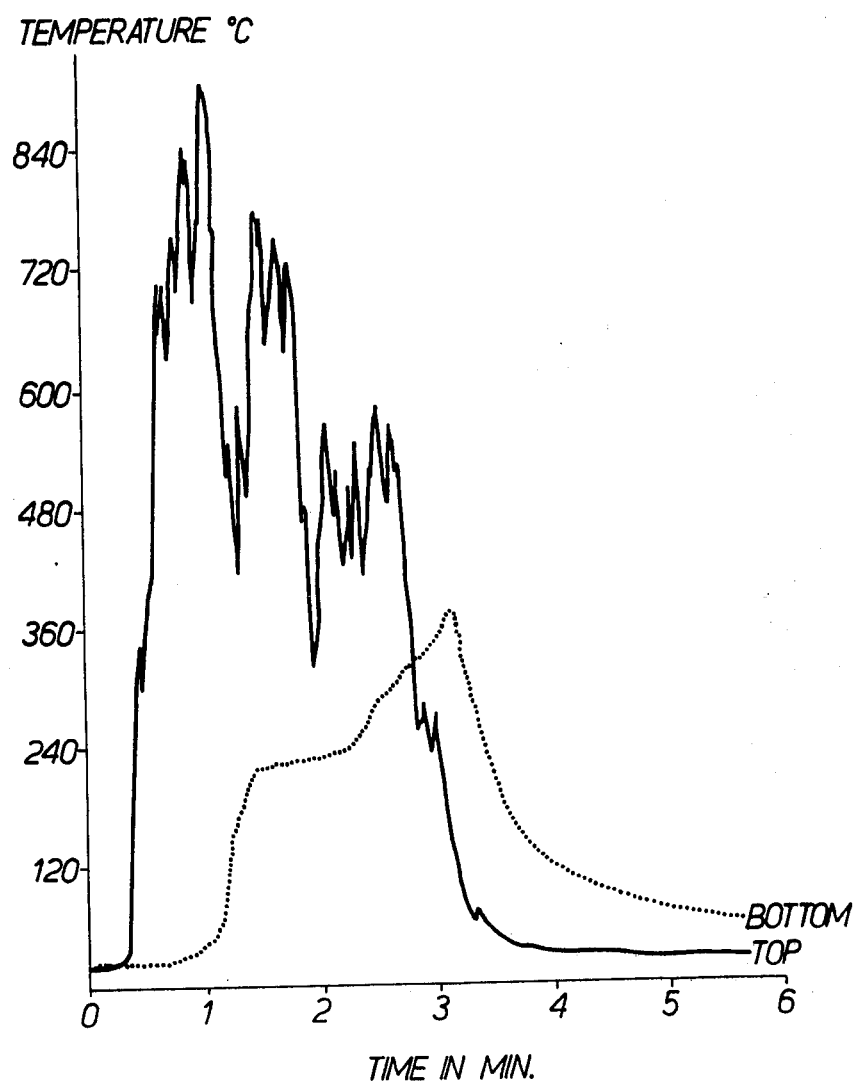
Figure 3:
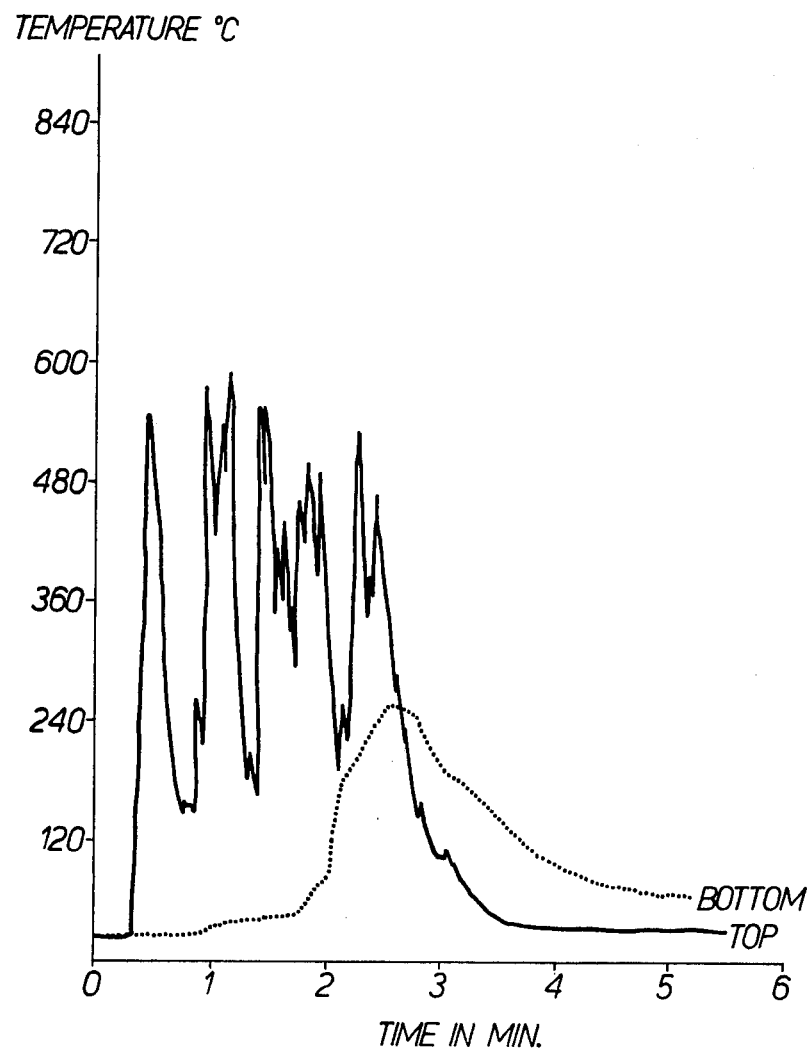

It will be seen from FIGS. 1 to 3 that, whilst maleic acid on its own was instrumental in substantially reducing the temperature experienced by the bottom thermocouple, this being due to char formation which acted to insulate the lower part of the disc, the multifunctional two acid system according to the present invention not only achieved a greater reduction in the temperature experienced by the bottom thermocouple, again due to char formation, but also significantly reduced the temperature experienced by the top thermocouple.

The effectiveness of the system in accordance with the present invention is further illustrated by the residual char value obtained after the tests, which were 14% (oily), 26% and 50% by weight of the foam material respectively. It will be appreciated that the high residual char value obtained using the system in accordance with the present invention represents a significant retention of carbon and nitrogen moeities which would otherwise have led to the generation of dangerous smoke and toxic gas products. This retention is shown quantitatively in the Table in Example 1.

EXAMPLE 4

A similar test procedure to that described in Example 3 was carried out on sample discs comprising:
 (A) Standard foam + 20% by weight maleic acid
 (B) Standard foam + 20% by weight maleic acid, +5% by weight oxalic acid,
 (C) Standard foam + 20% by weight maleic acid, +10% by weight malic acid; and
 (D) Standard foam + 20% by weight maleic acid, +6% by weight oxalic acid, +4% by weight malic acid.

Once again combustion was initiated at the top surface of the discs after thermocouples had been inserted into the centre of each disc at the top and bottom surfaces thereof.

Figure 4:
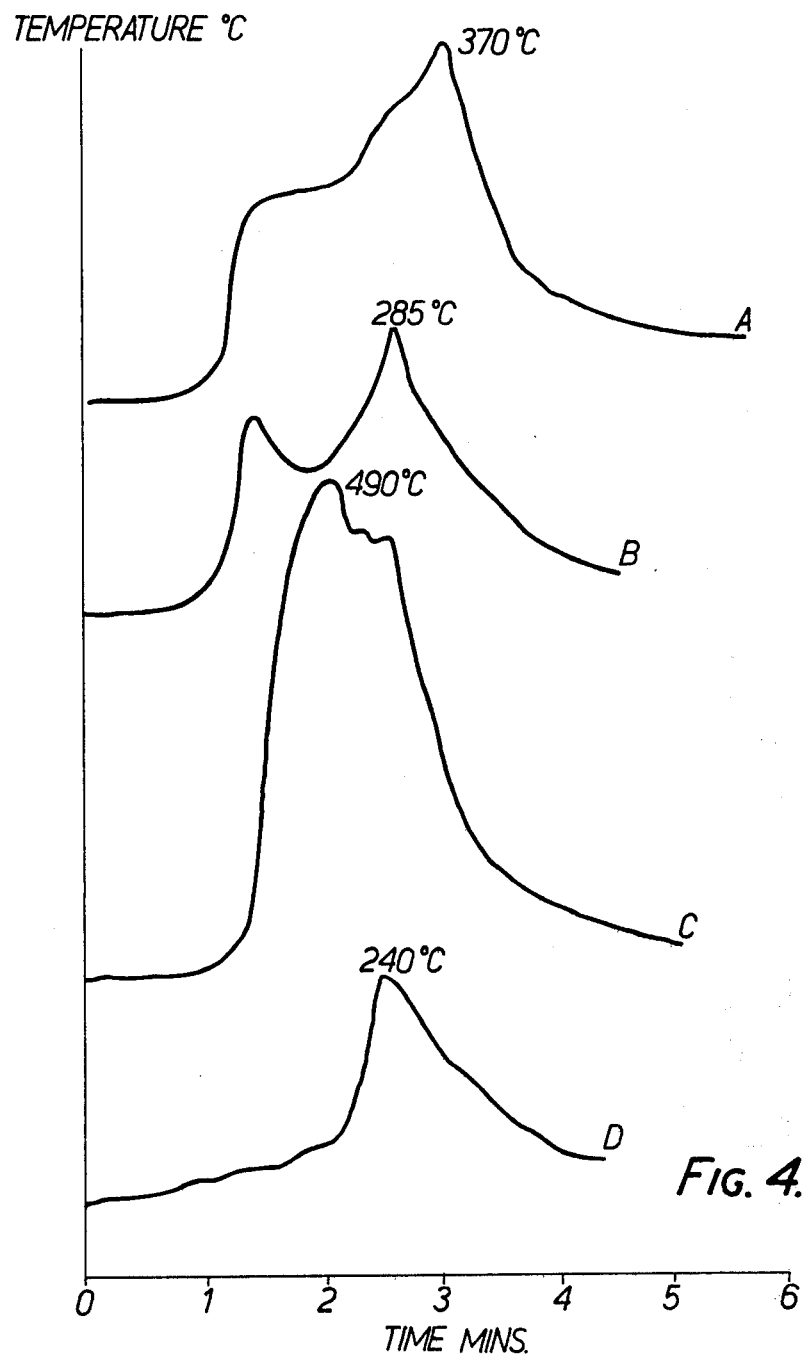

FIG. 4 shows the results obtained, the curves, labelled A to D, representing the temperatures experienced by the bottom thermocouple as combustion proceeded. The curves show that for formulations A and B, an initial temperature peak is followed in time by an increase in combustion temperature leading to a secondary temperature peak, the temperature of which is shown, which it is believed, can be attributed to degradation of the initially formed char followed by pyrolysis.

On the other hand, with formulations C and D, which, in accordance with the present invention, incorporate malic acid as a char-stabiliser, the curves exhibit only a single temperature peak, indicating that the char formation was regular and, in particular, that no secondary char pyrolysis occurred (this was confirmed by visual observation). It will also be noted that, using the preferred three component system D, there was a significantly longer delay period before the temperature rose sharply.

EXAMPLE 5

In this example, an untreated standard flexible polyurethane foam and a foam impregnated with 20% maleic acid, 6% oxalic acid and 4% malic acid, in accordance with the present invention, were subjected to a larger scale test, as follows.

Polyurethane foam cushions made from the two formulations were covered with a polypropylene fabric having a special backcoating treated so as to improve its resistance to ignition. This fabric was expected to exhibit thermoplastic behaviour, opening up under the influence of the ignition source.

The cushions were then assembled into chair shapes and supported on a steel chair frame. Each chair shape consisted of a seat cushion (45 cm × 25 cm × 10 cm) and a back rest cushion (45 cm × 50 cm × 10 cm).

The assembled chairs were positioned in a Fire Test facility which consisted of a Chamber (4 m × 3 m × 2.5 m) opening into a corridor (12 m × 1.2 m × 2.5 m). Steel doors with adjustable louvres were fitted at the end of the Corridor and at the outside entrance to the Test Chamber, and these doors were used to control ventilation to the sample in the Test Chamber. An Observation Room was placed so it was possible to photograph the Test Chamber during experiments and to take remote measurements of gas concentrations and smoke obscuration. Additional viewing ports in the external walls were provided for observation.

Burning newspaper was used as the ignition source, one sheet being placed on the seat cushion, where it touched the back rest cushion, a further sheet being placed across it at right angles. A match was used to ignite each end of the lower piece of paper.

The smoke generation from the two samples was measured by using a vertically-mounted light link consisting of a incandescent tungsten light source and a silicon chip photo-cell, with their respective collimating and focussing lenses. The output voltage from the system was monitored continuously on a multi-range potentiometric chart recorder (20 V to 10 mV range). The relationship between output voltage and optical density of the medium causing obscuration in the light path of the system was determined by calibration with standard neutral density filters. Measurements were made at the door between the Corridor and the Chamber and in the Corridor. The measurements being made in terms of optical density (D), a unit derived from Beer's Law and expressed as $$D = \log_{10} F_o/F$$

where $F_o$ = light intensity at the photocell in the absence of smoke

Figure 5:
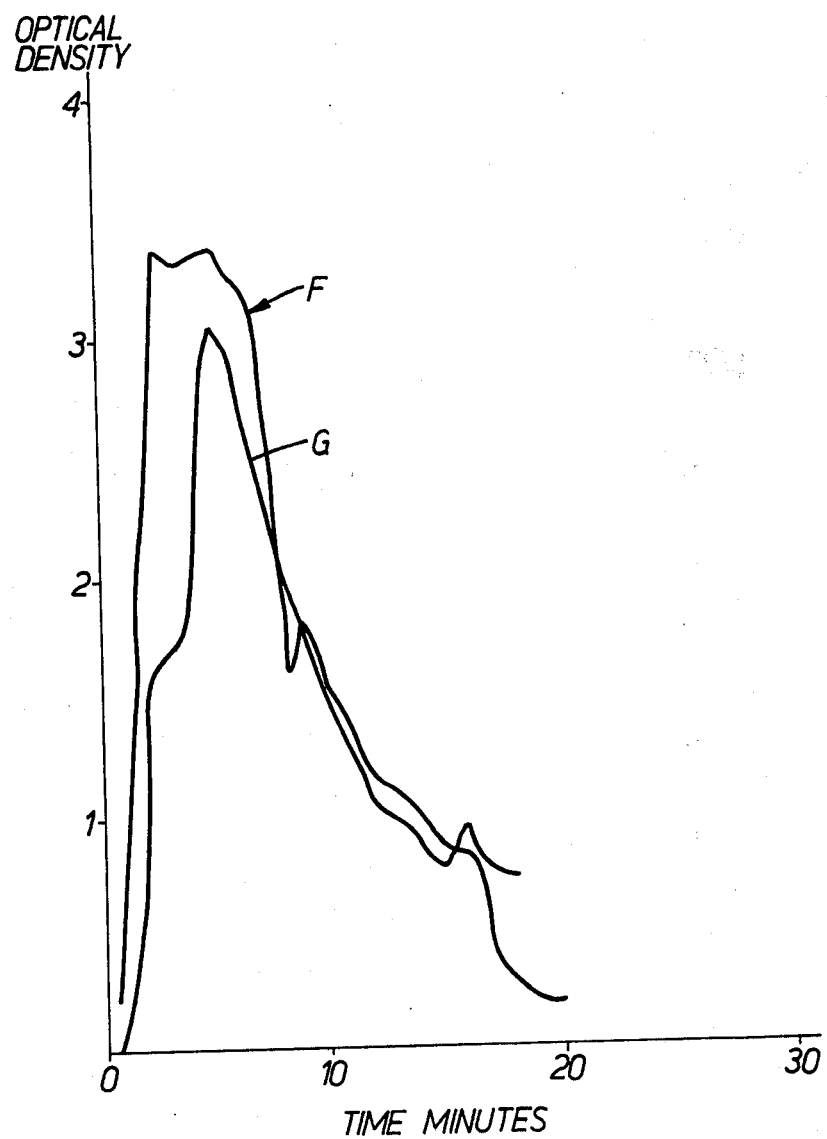
Figure 6:
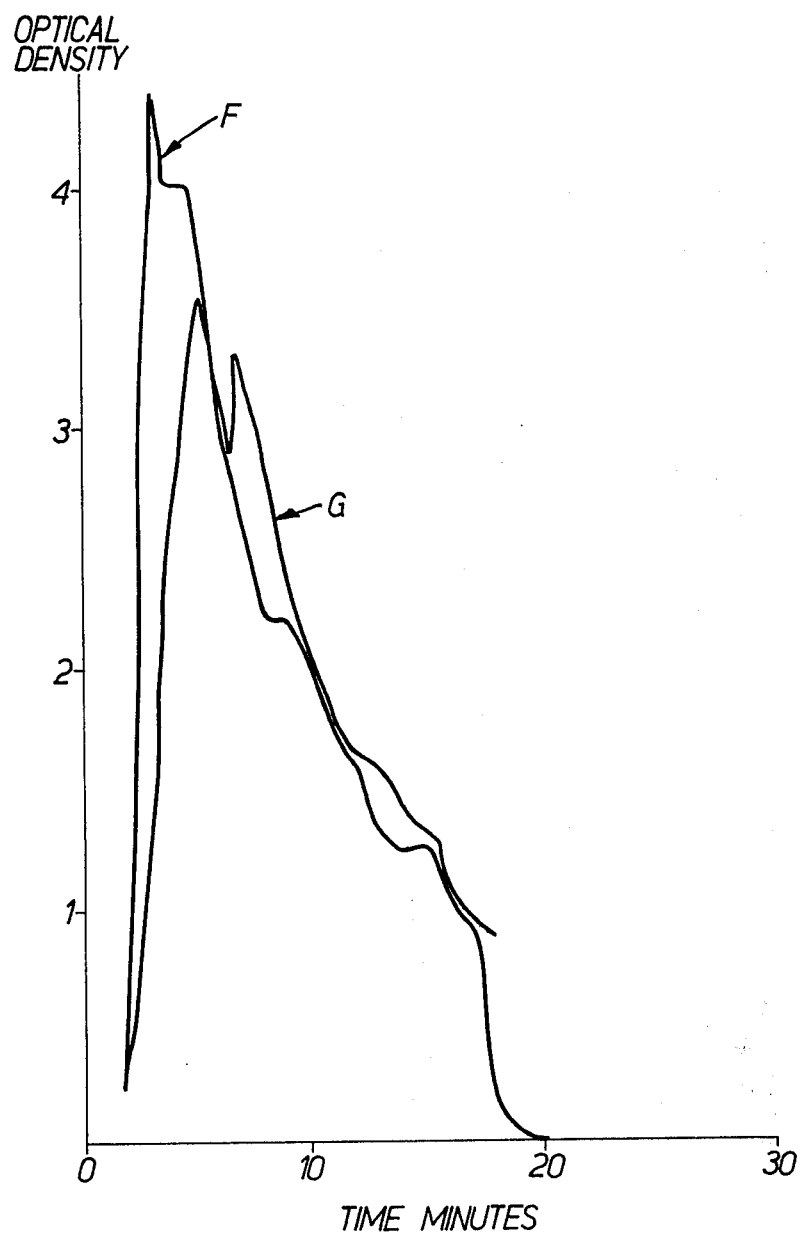
Figure 7:
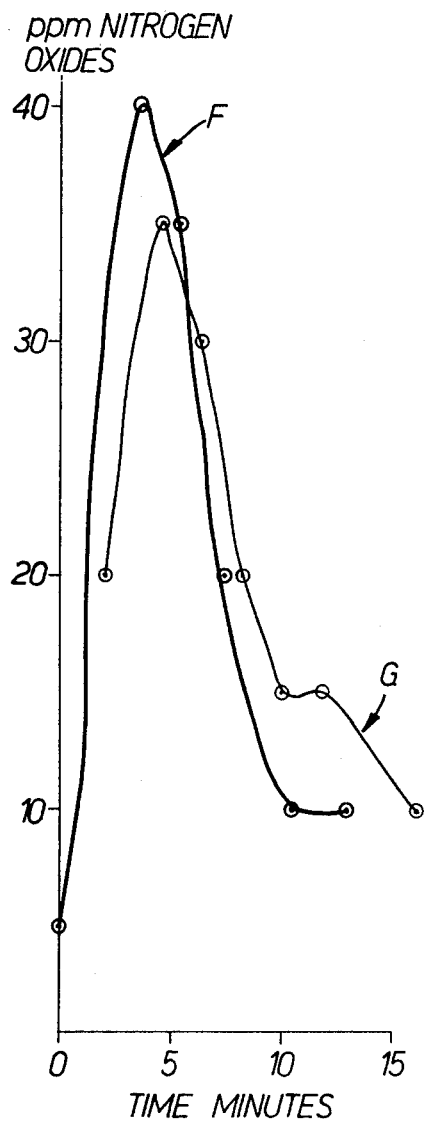
Figure 8:
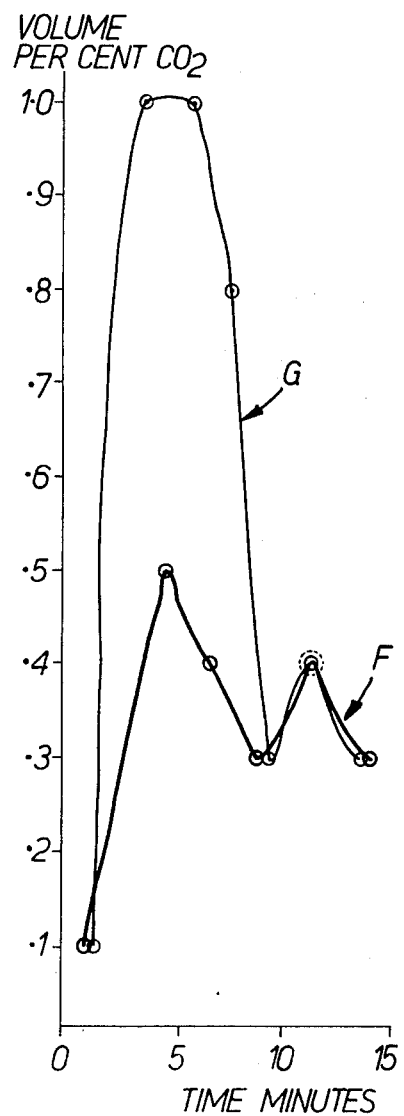
Figure 9:
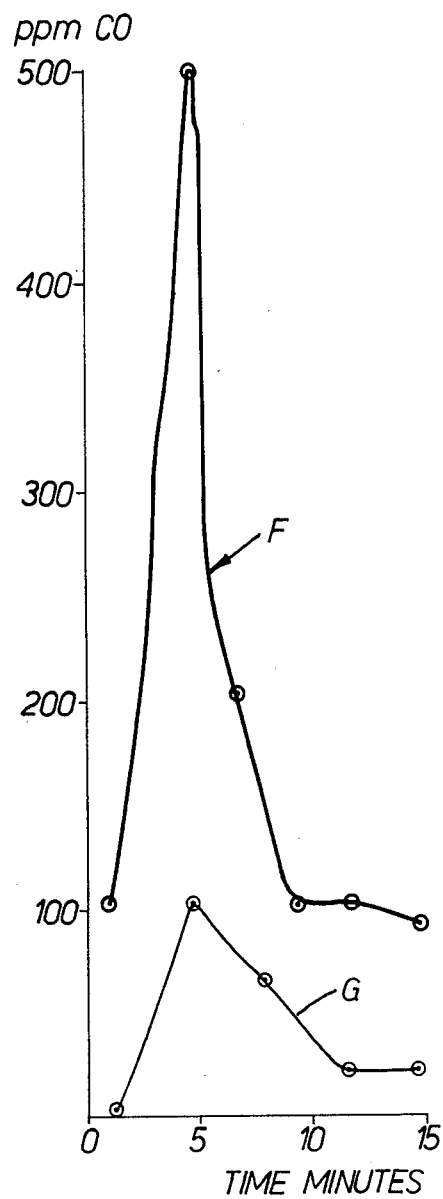
Figure 10:
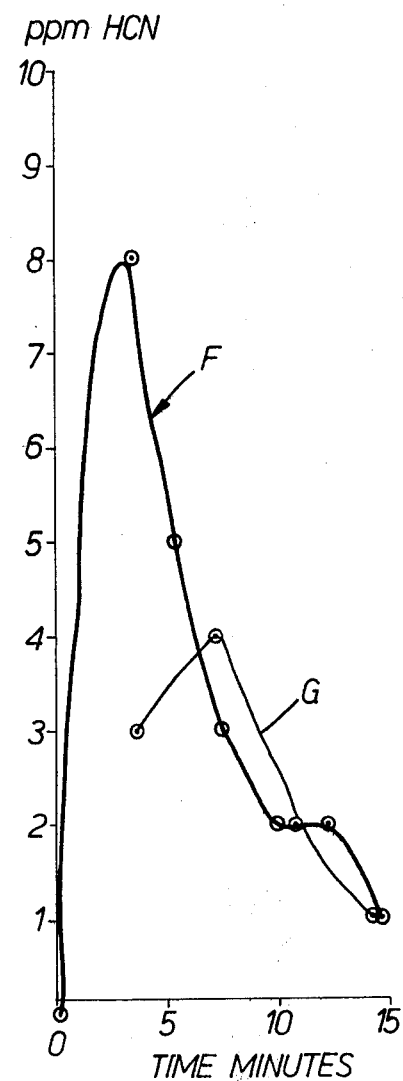

F = light intensity at the photocell in the presence of smoke, and being shown in FIGS. 5 (Door) and 6 (Corridor) in which Curve F represents the untreated standard sample and Curve G the sample in accordance with the invention. As will be seen, the maximum obscuration in the untreated foam (the values again being logarithmic) was very much higher than that for the foam incorporating the multifunctional STG-suppressant system of the present invention.

In addition, sampling lines were connected from the observation room to a point in the doorway at a height of 1.6 meters above the floor, which corresponds approximately to the layers of air that would be breathed by a standing adult; the sample lines being attached to a Draeger gas measuring system.

Measurements were made intermittently using the Draeger colorimetric tubes type 6724001, CH23501, CH20601 and CH25701 for oxides of nitrogen, carbon dioxide, carbon monoxide, and hydrogen cyanide, respectively, the results being shown in FIGS. 7, 8, 9 and 10, respectively. It will be seen from these that the foam incorporating the multifunctional system according to the present invention generated substantially lower amounts of the toxic substances HCN, nitrogen oxides and carbon monoxide but, as might be expected, produced a larger volume of carbon dioxide, which is relatively harmless.

In the following Examples, further samples made from formulations based on the flexible polyurethane foam D7 employed as standard in Examples 1 and 2 were burnt in air and in a conical furnace as described in Example 2. The samples, other than the standard, were prepared by impregnation of the standard as described in Example 1. The samples were prepared in the form of discs of diameter 3" (~75 mm) and height 1" (~25 mm) and fitted with thermocouples as described in Example 3. The maximum temperature in °C. experienced by the bottom thermocouple, $T_{max}$, is used to obtain an ablation index for a sample, defined as $$\frac{\text{Ablation Index}}{100} = \frac{T_{max}(D7) - T_{max}(\text{sample})}{T_{max}(\text{sample})}$$

For the more accurate measurement of char formation, the samples were placed on a wire gauze, to allow escape of liquid.

$D_{max}$, in the tables below, is the maximum optical density of the smoke measured when burning the samples in the conical furnace at a temperature of 850° C. in an air atmosphere.

EXAMPLE 6

In this example, various proportions of maleic, oxalic and malic acids were used. The results are shown in Table 1.

EXAMPLE 7

In this example, component (A) was varied. The results are shown in Table 2, which demonstrates the good all-round results obtained by using pyromellitic dianhydride.

EXAMPLE 8

In this example, component (B) was varied, in the presence of two examples of component (A) shown by previous examples to give good results, namely maleic acid and pyromellitic dianhydride. Trimellitic acid, particularly when used with pyromellitic dianhydride, gives especially good results.

EXAMPLE 9

In this example, component (C) was varied, using the preferred combinations of components (A) and (B). The results are shown in Table 4.

EXAMPLE 10

In this example, burning tests were conducted on full size cushions constructed of polyurethane foam, either uncovered or covered by polypropylene or viscose velour cases. The polypropylene-covered cushions were tested as described in Example 5, i.e., using seat and back rest cushions. The tests on uncovered cushions and those covered by viscose velour were carried out using four cushions, a seat cushion of 45 cm (front-to-back) × 50 cm (width) × 10 cm (thickness), a back rest of 45 cm (height) × 50 cm (width) × 10 cm and two arm rests of 45 cm (front-to-back) × 25 cm (height) × 10 cm, the remaining conditions being as described in Example 5. The results are shown in Table 5 and 6. From the results, which confirm those of the small scale tests described above, it can be seen that STG-suppressant systems according to the invention reduce or delay smoke and toxic gas emission significantly.

The Table also shows that Foam K, which contains a conventional flame retardant system together with component A, does not have these advantages.

The advantages obtained by using the multifunctional systems of the present invention, especially those which, in preferred embodiments, utilise a mixture of two or more carboxylic acids, will be apparent from the foregoing Examples and it will be appreciated that various other systems in accordance with the present invention will also afford such advantages.

TABLE 1

OPTIMISATION OF COMPONENT PROPORTIONS

| Additive | | | $D_{max}$ | % Char | Ablation Index | Smoke Rating |
|---|---|---|---|---|---|---|
| — (D7) | | | 0.30 | ~30 | 0% (by definition) | 3 |
| Maleic | Oxalic | Malic | | | | |
| 20 | 8 | 2 | .26 | ~40 | 9 | 2 |
| 20 | 6 | 4 | .26 | ~20 | 8 | 1 |
| 20 | 4 | 6 | .32 | ~50 | 14 | 1 |
| 20 | 2 | 8 | .31 | ~30 | 0 | 2 |
| 10 | 10 | 10 | .25 | 30 | 11 | 2 |
| 15 | 10 | 5 | .26 | 40 | 13 | 1 |
| 25 | 5 | — | .36 | 40 | 20 | 1 |
| 25 | — | 5 | .31 | 20 | 0 | 2 |

TABLE 2

POTENTIAL CHAR FORMERS

| Additive | $D_{max}$ | % Char | Ablation Index | Smoke Rating |
|---|---|---|---|---|
| D7 | .30 | 30 | 0 | 3 |
| 20% Maleic acid | .24 | 30 | 14 | 2 |
| 20% Trimellitic acid* | .33 | 50 | 6 | 2 |
| 20% Pyromellitic acid | .22 | 60 | 13 | 2 |
| 20% Malonic acid | .29 | 20 | 0 | 2 |
| 20% Succinic acid | .26 | 20 | | 2 |
| 20% Fumaric acid | .32 | 10 | | 2 |
| 20% Pyromellitic dianhydride | .23 | 60 | 45 | 1 |

*FR activity

TABLE 3
POTENTIAL COMBUSTION MODIFIERS

| Additive | $D_{max}$ | % Char | Ablation Index | Smoke Rating |
|---|---|---|---|---|
| 25% Maleic Acid 5% Trimellitic acid | .27 | 13 | 6 | 1 |
| 25% Maleic Acid 5% Alumina hydrate | .50 | 12 | — | — |
| 25% Maleic Acid 5% Ammonium Polyphosphate | .69 | 18 | 44 | 2 |
| 25% Py. Dianh. 5% Trimellitic acid | .28 | 37 | 55 | 0 |
| 25% Py. Dianh. 5% Alumina Hydrate | .28 | 25 | 22 | 0 |
| 25% Py. Dianh. 5% Ammonium Polyphosphate | .42 | 28 | 3 | 1 |
| Std. | 0.30 | 1 | 0 | 3 |
| 25% Maleic 5% Oxalic | 0.36 | 40 | 20 | 1 |

TABLE 4
THREE COMPONENT SYSTEMS

| SAMPLE | $D_{max}$ | $T_{max}$ bottom TC | Ablation Index % | Char Yield % | Smoke Rating |
|---|---|---|---|---|---|
| 20% Maleic/5% Oxalic/5% Malic | .46 | 564 | 3.6 | 8.5 | 1 |
| 20% Maleic/5% Trimellitic/5% Malic | .45 | 480 | 17.2 | 13.6 | 1 |
| 20% Maleic/5% Trimellitic/5% Lactic | .44 | 575 | 1.8 | 11.3 | 1 |
| 20% Maleic/5% Trimellitic/5% Mucic | .68 | 489 | 16.4 | 12.4 | 1 |
| 20% Py. Dian./5% Oxalic/5% Malic | .42 | 447 | 23.6 | 20.5 | 0 |
| 20% Py. Dian./5% Trimellitic/5% Citric | .49 | 490 | 16.0 | 38.9 | 0 |
| 20% Py. Dian./5% Trimellitic/5% Tartaric | .49 | 345 | 41.1 | 46.2 | 0 |
| 20% Py. Dian./5% Trimellitic/5% Ascorbic | .52 | 102 | 82.7 | 44.8 | 0 |
| D7 | 0.61 | 585 | 0 | 0.7 | 3 |

Notes

1. Ablation Index $= \dfrac{T_{max\,(DT)} - T_{max\,(additive)}}{T_{max\,(DT)}} \times 100$

TABLE 5
LARGE SCALE RESULTS

| Cover | Foam | $D_{max}$ (O.D.) | Smoke $T_{max}$ (mins) | $S_{tot}$ |
|---|---|---|---|---|
| PP | D | 0.91 | 5.5 | 51 |
|  | H | 0.63 | 6.0 | 37 |
|  | K | 1.85 | 4.5 | 97 |
|  | Std. | 1.16 | 2.8 | 60 |
| VV | D | 0.79 | 8.0 | 47 |
|  | H | 0.37 | 12.5 | 35 |
|  | Std. | 1.66 | 5.5 | 78 |
| Uncovered | D | 1.45 | 3.5 | 74 |
|  | H | 0.54 | 3.5 | 27 |
|  | Std. | 2.35 | 2.0 | 100 |

D = Maleic acid 20% Oxalic acid 5% Malic acid 5%
H = Pyromellitic Dianhydride 20% Trimellitic acid 5% Tartaric acid 5%
Std. = D7
K = Trimellitic Acid 25% 1,3-Dichloropropyl phosphate 5% (not in accordance with the invention)

TABLE 6
AVERAGE GAS CONCENTRATIONS DURING FIRST TEN MINUTES

| | | Time (minutes) | | | | |
|---|---|---|---|---|---|---|
| | | 2 | 4 | 6 | 8 | 10 |
| HCN polypropylene covers | STD | 1.0 | 2.2 | 1.3 | 0.7 | 0.5 |
| | D | 0.2 | 1.0 | 0.7 | 0.5 | 0.2 |
| | H | 0.1 | 0.7 | 0.9 | 1.5 | 1.1 |
| HCN viscose velour covers | STD | 0.6 | 1.5 | 2.0 | 2.0 | 1.4 |
| | D | 0 | 0.7 | 1.1 | 1.5 | 1.5 |
| | H | 0 | 0.1 | 0.5 | 1.0 | 1.6 |
| CO polypropylene covers | STD | 50 | 40 | 35 | 25 | 10 |
| | D | 38 | 30 | 25 | 15 | 13 |
| | H | 12 | 30 | 55 | 95 | 100 |
| CO viscose velour covers | STD | 40 | 60 | 100 | 100 | 100 |
| | D | 30 | 80 | 150 | 150 | 250 |
| | H | 20 | 50 | 100 | 190 | 300 |

D, H and STD are as in Table 5.

What we claim is:

1. A composition comprising a combustible material and an effective amount of a smoke and toxic gas (hereinafter STG) suppressant composition comprising (A) an STG suppressant component together with at least one component selected from components (B) and (C), component (B) being selected from components that are combustion rate-reducing, flame temperature-reducing, or both flame temperature- and combustion rate-reducing, component (C) being a charstablising component, at least two different chemical compounds being present to perform the functions of components A and B, A and C, or A, B and C.

2. A composition as claimed in claim 1, wherein the combustible material is a material containing isocyanate linkages.

3. A composition as claimed in claim 1, wherein the material is a polyurethane.

4. A composition as claimed in claim 1, which is in the form of a foam.

5. A composition as claimed in claim 4, which is in the form of a rigid foam.

6. A composition as claimed in claim 4, which is in the form of a flexible foam.

7. A composition as claimed in claim 1, wherein component (A) is selected from the group consisting of polycarboxylic acids and polycarboxylic acid anhydrides.

8. A composition as claimed in claim 7, wherein component (A) is maleic acid or pyromellitic dianhydride.

9. A composition as claimed in claim 1, wherein the composition comprises component (B) and wherein component (B) is oxalic acid or trimellitic acid.

10. A composition as claimed in claim 1, wherein the composition comprises component (C) and wherein component (C) is malic or tartaric acid.

11. A composition as claimed in claim 1, which comprises components (A), (B), and (C).

12. A composition as claimed in claim 11, which comprises from 1 to 50 parts by weight of components (A), (B) and (C) based on the weight of the material.

13. A composition as claimed in claim 11, which comprises from 7 to 30 parts by weight of components (A), (B) and (C) based on the weight of the material.

14. A composition as claimed in claim 11, wherein component (A) constitutes at least 30% by weight of the total weight of components (A), (B) and (C).

15. A composition as claimed in claim 11, wherein component (A) constitutes from 40 to 80% by weight of the total weight of components (A), (B) and (C).

16. A composition as claimed in claim 11, wherein components (B) and (C) are present in a weight ratio of from 4:1 to 1:4.

17. A composition as claimed in claim 11, wherein components (B) and (C) are present in approximately equal amounts by weight.

18. A composition as claimed in claim 11, wherein the STG suppressant composition comprises (A) maleic acid, (B) oxalic acid and (C) malic acid.

19. A composition as claimed in claim 11, wherein the STG suppressant composition comprises (A) pyromellitic dianhydride, (B) trimellitic acid and (C) tartaric acid.

20. A composition as claimed in claim 18 or claim 19, wherein the components (A), (B) and (C) are present in proportions of 20%, 5% and 5% respectively, based on the weight of the material.

21. A foamed composition comprising a polyurethane and an STG suppressant composition comprising (A) maleic acid, (B) oxalic acid and (C) malic acid.

22. A process for the manufacture of a shaped structure of foamed polyurethane having a reduced or retarded tendency to emit smoke and toxic gas during combustion which comprises incorporating into a foamable polyurethane-producing reaction mixture a composition comprising (A) an STG suppressant component together with at least one component selected from the group consisting of component (B) and component (C), component (B) being selected from the group consisting of combustion rate-reducing components, flame temperature-reducing components and components which reduce both combustion rate and flame temperature, component (C) being a char-stabilising component, at least two different chemical compounds being present to preform the functions of components A and B, A and C, or A, B and C.

23. A process for the manufacture of a shaped structure of foamed polyurethane having a reduced or retarded tendency to emit smoke and toxic gas during combusition which comprises incorporating into the foamed structure a composition comprising (A) an STG suppressant component together with at least one component selected from the group consisting of component (B) and component (C), component (B) being selected from the group consisting of combustion rate-reducing components, flame temperature-reducing components and components that reduce both combustion rate and flame temperature, component (C) being a char-stabilising component, at least two different chemical compounds being present to perform the functions of components A and B, A and C, or A, B and C.

24. A process as claimed in claim 23, wherein the composition is incorporated in the foam structure in the form of a dispersion or solution in a liquid medium that does not damage the foam structure and subsequently removing the medium by evaporation.

25. A composition comprising (A) an STG suppressant component together with at least one component (B) and at least one component (C), component (B) being selected from the group consisting of combustion rate-reducing components, flame temperature-reducing components, and components which reduce both flame temperature and combustion rate, component (C) being a char-stabilising component, at least two different chemical compounds being present to perform the functions of components A and B, A and C, or A, B and C.

26. A composition as claimed in claim 11, which comprises a different chemical compound to perform the functions of each of the components (A), (B) and (C).

27. A foamed composition comprising a polyurethane and an STG suppressant composition comprising (A) pyromellitic dianhydride, (B) trimellitic acid and (C) tartaric acid.

28. A composition as claimed in claim 21 or claim 27, wherein the components (A), (B) and (C) are present in proportions of 20%, 5% and 5% respectively, based on the weight of the polyurethane.

* * * * *